United States Patent [19]

Kolarik et al.

[11] Patent Number: 4,787,979

[45] Date of Patent: Nov. 29, 1988

[54] LIQUID-LIQUID EXTRACTION PROCESS

[75] Inventors: Zdenek Kolarik, Karlsruhe; Ulrich Galla, Neuthard; Klaus Roth, Bad Königshofen, all of Fed. Rep. of Germany

[73] Assignee: Kernforschungszentrum Karlsruhe GmbH, Karlsruhe, Fed. Rep. of Germany

[21] Appl. No.: 942,401

[22] Filed: Dec. 16, 1986

[30] Foreign Application Priority Data

Dec. 24, 1985 [DE] Fed. Rep. of Germany ....... 3546128

[51] Int. Cl.$^4$ .............................................. B01D 11/04
[52] U.S. Cl. ..................................................... 210/634
[58] Field of Search ............... 210/634; 422/256, 258; 423/8

[56] References Cited
U.S. PATENT DOCUMENTS 4,385,037  5/1983  Paris et al. ......................... 210/634

OTHER PUBLICATIONS

Petrich, G., "Computer-Simulation of the Purex Process", *Nukleare Entsorgung* [*Nuclear Fuel Cycle*], vol. 2, Ch. 20, Verlag Chemie GmbH (1982), pp. 317-332.

*Primary Examiner*—Frank Spear
*Attorney, Agent, or Firm*—Spencer & Frank

[57] ABSTRACT

A liquid-liquid two-phase extraction process in which a feed solution is introduced into an intermediate stage of a multistage extraction apparatus. The solution is water and one or more valuable material to be recovered by extraction. An organic extractant is introduced into one end of the apparatus. The extractant is a solvent and flows through the apparatus. The valuable material is extracted from the feed solution to provide a charged organic phase. An aqueous extractant having water is introduced into another end of the apparatus to wash the charged organic phase. The aqueous extractant flows through the multistate extraction apparatus countercurrent to the extractant and contributes to the aqueous phase. The organic extractant is divided into at least two streams prior to introducing the organic extractant into the apparatus. Each stream is introduced into the apparatus at different stages, both ahead of the intermediate stage.

20 Claims, 3 Drawing Sheets

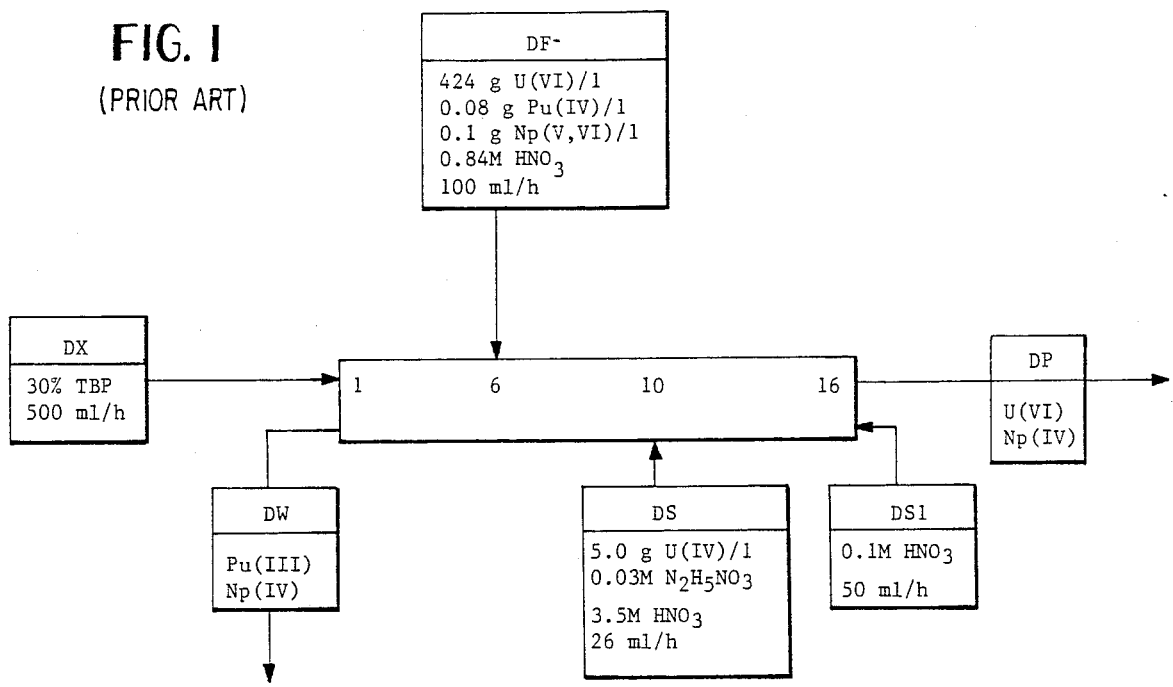
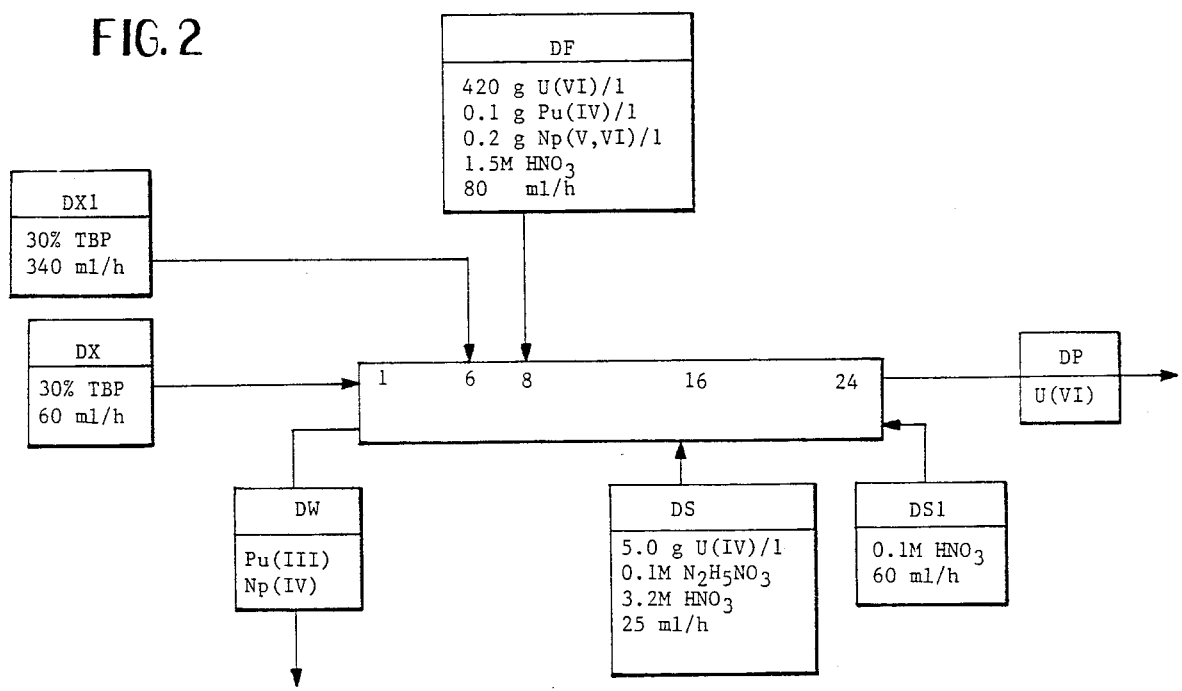

LIQUID-LIQUID EXTRACTION PROCESS

BACKGROUND OF THE INVENTION

1. Field of the Invention

This invention relates to a process for improving a liquid-liquid extraction process in which—in a two-phase system comprising a liquid aqueous phase and a liquid organic phase with one of the two phases as starting liquid—one or more valuable materials are separated from impurities and, where several valuable materials are present, from one another in a multistage extraction apparatus, the valuable materials being transferred by extraction from the starting liquid to the other phase which becomes charged with the valuable materials and the charged phase is washed with at least one washing liquid corresponding to the starting liquid.

2. Description of The Related Art

Liquid-liquid extraction processes are generally used to obtain or recover valuable materials, such as for example ions, compounds or complexes containing metallic elements, and are carried out in extraction columns, more especially in pulsed columns, in mixer-settlers or in a battery of centrifugal extractors, etc. Liquid-liquid extraction processes are also used in particular in the reprocessing of burnt-up nuclear fuels and/or fertile materials. In this case, uranium alone and/or plutonium is/are extracted from an aqueous dissolver solution containing nitric acid into the organic solution as uranyl nitrate or plutonium(IV) nitrate using tributyl-phosphate (TBP). To this end, the two phases flow in countercurrent in the apparatus mentioned. The organic phase used is generally a 30% by volume solution of TBP in an aliphatic diluent or solvent which effectively extracts the uranium or even the plutonium from solutions of nitric acid or from other solutions. In most cases, half the countercurrent extractor, in which the extraction takes place, may be used for washing the organic phase previously. In this case, therefore, the beginning and end of an extractor are so defined that the organic phase—in the present case the extractant phase—is introduced at the beginning of the extractor, an aqueous solution of uranium and, possibly, plutonium is fed as feed solution into a central part of the extractor and an aqueous washing solution is introduced at the end of the extractor. The uranium and the plutonium are analogously re-extracted from the charged organic phase as feed solution, the charged organic phase being introduced into a central part of the extractor. The aqueous phase—in this case the extractant phase—is then introduced at the end of the extractor while fresh organic phase is introduced at the beginning of the extractor, washing out from the aqueous re-extract those ingredients of the solution which are not to be re-extracted with the uranium or plutonium.

In the extraction process, the concentration of uranium in the aqueous feed solution can vary within wide limits. However, a reasonably high uranium concentration (70–90 g/l) has hitherto been sought in the organic phase in order to suppress the extractability of substances to be separated off (i.e. fission products, neptunium, etc.). Where the concentration of uranium in the feed solution was low, for example 30–50 g/l, the extractor was operated on a so-called dilute flow scheme. With a so-called concentrated flow scheme, the aqueous phase contains from 200 to 430 g U/l. It is clear that the ratio of the flow rates of the organic phase and the aqueous phase has to be kept low (0.3–0.7) in the dilute flow scheme and high (2–6) in the concentrated flow scheme. It is an advantage of the concentrated flow scheme that the total throughput of the phases is distinctly lower, i.e. by a factor of 1.6 to 3.5, than in the dilute flow scheme. This enables smaller extraction apparatus and vessels to be used in a reprocessing plant and, hence, building costs for shielded rooms to be reduced. By contrast, it may be regarded as an advantage of the dilute flow scheme that the effectiveness of separation of the extraction process is better. For example, neptunium(IV) which is only moderately extractable, is extracted together with uranium(VI) in the concentrated flow scheme because, in view of the high phase flow ratio, the extraction factor of neptunium(IV) is greater than 1 (the extraction factor is defined as the product of the distribution coefficient and the phase flow ratio). If the organic phase charged with uranium remains unwashed or is washed with a sufficiently concentrated solution of nitric acid, the neptunium leaves the extractor in the organic phase together with the uranium. If, however, the charged organic phase is washed with a dilute solution of nitric acid for better decontamination of fission products, the neptunium accumulates in the extractor. In a dilute flow scheme, the extraction factor of uranium is high enough for a good extraction yield whereas the extraction factor of neptunium(IV) falls to below 1 and the neptunium(IV) remains predominantly in the aqueous raffinate.

SUMMARY OF THE INVENTION

The object of the present invention is to improve the effectiveness of a liquid-liquid extraction process in which—in a two-phase system comprising a liquid aqueous phase and a liquid organic phase with one of the two phases as starting liquid—one or more valuable materials are separated from impurities, i.e. purified, and—where several valuable materials are present—from one another in a multistage extraction apparatus. The invention seeks to obtain the desired valuable-material products in pure form both in regard to impurities and in regard to other valuable materials. In particular, the invention seeks to separate and free actinide ions, actinide compounds or actinide complexes in aqeuous or organic solutions, of the type accumulating in the reprocessing of burnt-up nuclear fuels and/or fertile materials, from fission and corrosion products present in those solutions and to obtain them individually in pure form, even in regard to other actinides, in solution, such as for example uranium or plutonium. The invention seeks to combine the advantages of the so-called concentrated flow scheme with those of the so-called dilute flow scheme.

According to the invention, these objects are achieved in that (a) before it is fed into the extraction apparatus, the extractant phase is divided up into at least two partial streams and the two partial streams thus formed are individually introduced at different points of the extraction apparatus ahead—in their direction of flow—of the point of introduction of the phase to be extracted, or (b) in addition to step (a), the liquid corresponding to the phase to be extracted, for washing the charged extractant phase, is completely or partly removed from the extraction apparatus at a point thereof situated ahead—in the direction of flow of the liquid—of the point of introduction of the phase to be extracted, is guided past a predetermined number of stages of the extraction apparatus and is fed back into the extraction apparatus at a point following the point of introduction in the direction of flow.

In cases where the starting liquid containing the valuable materials consists of an aqueous solution and the extractant phase consists of a solution of an extractant in an organic solvent or diluent, the extractant phase is divided up in step (a) in a ratio of the flow rates of two partial streams of from 1:20 to 1:1.5, the point of introduction for the partial stream having the higher flow rate being situated nearer the point of introduction of the starting liquid than the point of introduction of the partial stream having the lower flow rate. In cases where the starting liquid containing the valuable materials consists of an organic solution of valuable-material compounds or complexes in an organic solvent and the extractant phase consists of an aqueous solution, the extractant phase is divided up in step (a) in a ratio of the flow rates of two partial streams of from 1:20 to 1:1.5, the point of introduction of the partial stream having the higher flow rate being situated nearer the point of introduction of the starting liquid than the point of introduction of the partial stream having the lower flow rate. In cases where the starting liquid containing the valuable materials consists of an organic solution of valuable-material compounds or complexes in an organic solvent and the extractant phase consists of an aqueous solution, the extractant phase is divided up where steps (a) and (b) are applied together in a ratio of the flow rates of two partial streams of from 1:10 to 10:1. In cases where the liquid for washing the charged extractant phase consists of an organic solution and the extractant phase consists of an aqueous solution, the washing liquid is at least partly fed into the apparatus at that end thereof opposite the outlet for the stream of organic product, is removed from the apparatus at an extraction stage preceding the stage where the starting liquid is fed in on account of a barrier for the washing liquid in the apparatus and is fed back into the apparatus 2 to 12 stages after the stage where the starting liquid is fed in. In one advantageous embodiment of the invention, the partial stream (BX1) of the aqueous extractant solution, which is introduced nearer the stage where the organic starting liquid (feed solution) is fed in, is used in a smaller quantity than the other partial stream BX.

Through the process according to the invention, the advantages of both hitherto known flow schemes are combined in a single flow scheme in which only part of the organic phase, for example, rather than the entire stream thereof, is introduced at the beginning of an extractor. The rest of the organic stream then has to be introduced in one or more partial streams between the beginning of the extractor and the point of introduction of the feed solution. Thus, in one ore more sections, the extractor operates under flow conditions corresponding to a dilute flow scheme and, in one or more sections, under flow conditions corresponding to a concentrated flow scheme.

The split introduction of one of the phases into a countercurrent extractor in accordance with the invention may also be applied in cases where only one of the components of an organic phase charged with two or more components is to be extracted therefrom into an aqueous stream. In this case, only part of the aqueous stream is fed in at the end of the extractor while the rest is introduced in one or more partial streams between the end of the extractor and the point of introduction of the charged organic phase.

Finally, different phase flow conditions may be established in different sections of a countercurrent extractor by diverting a stream past one section of the extractor. If, for example, a charged organic phase is introduced into the middle of an extractor and a fresh organic phase at the beginning of the extractor, the two organic phases combine with one another where the charged organic phase is fed in. According to the invention, however, the path of the fresh organic phase to the point of introduction of the charged organic phase is blocked, the fresh organic phase is removed from the extractor before the barrier and, after passing a section of the extractor of any desired length, is reintroduced and is thus combined with the charged organic phase outside its point of introduction.

BRIEF DESCRIPTION OF THE DRAWING

Further objects and advantages of the inventive countercurrent extraction process will become apparent to those skilled in the art of countercurrent extraction from the following detailed description taken in conjunction with the drawing in which:

FIGS. 1 and 3 are schematics of countercurrent extraction processes according to the prior art, wherein feed solutions DF and BF, respectively, from which valuable materials are to be extracted are aqueous solutions and organic solutions, respectively.

FIGS. 2 and 4-6 are schematics of various embodiments of the countercurrent extraction process according to the present invention, wherein feed solutions DF and BF, respectively, from which valuable materials are to be extracted are aqueous solutions and organic solutions, respectively.

DESCRIPTION OF THE PREFERRED EMBODIMENTS

Figure 3:
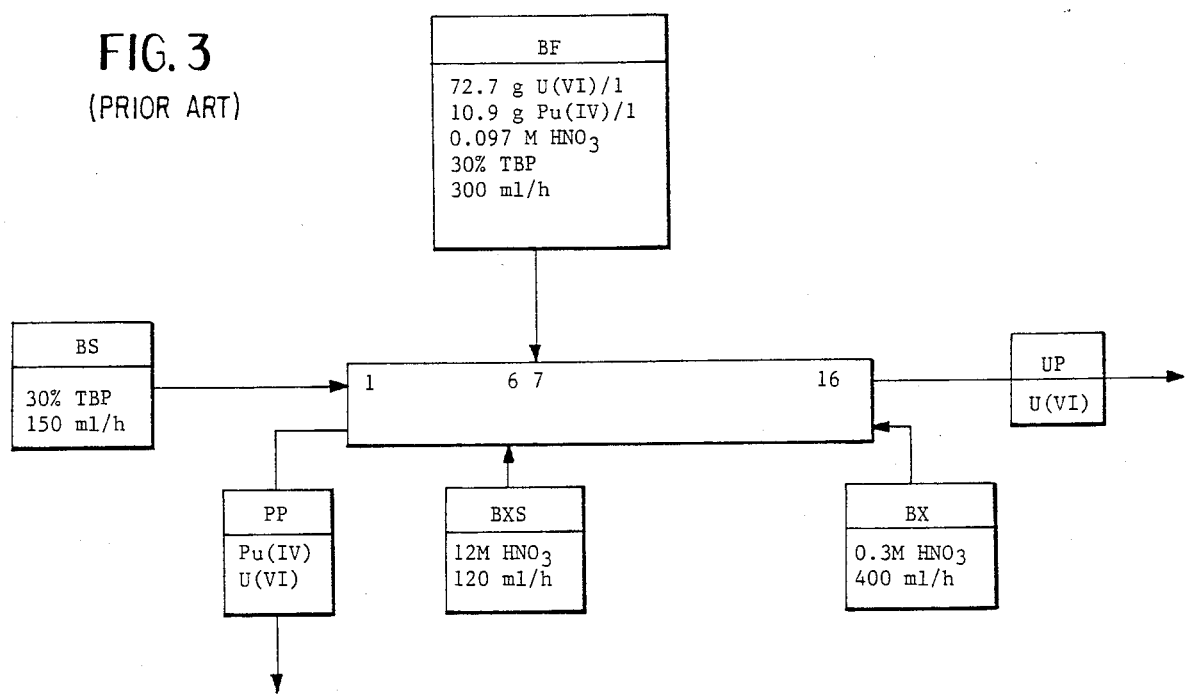

The invention is further illustrated by the following Examples.

EXAMPLE 1

(a) Flow scheme applied, for example, in the Purex process for purifying uranium In the conventional flow scheme (see FIG. 1), designed here for a 16-stage mixer-settler, feed solution DF used is a moderately acidic, aqueous solution DF rich in uranium. In addition to uranium, the feed solution contained small quantities of plutonium(IV) and neptunium(V, VI), which had not been separated from the uranium in the first extraction cycle and which are to be separated off in the purification process. In stages 1 to 6, the uranium(VI) was extracted using organic extractant DX and the charged organic phase was washed first with a relatively concentrated solution, aqueous extractant DS (fed in at one of stages 7 to 10) and then with a relatively dilute solution of nitric acid aqueous extractant DS1 (fed in at stage 16) for the decontamination of fission products.

The present Example, of which the conditions are shown in FIG. 1, produced the following results:

In stages 1 to 6, the uranium(VI) was extracted in such a high yield that the loss of uranium to aqueous raffinate DW amounted to only <0.1% by weight. The uranium(IV) introduced in the DS stream was predominantly reoxidized and extracted as uranium(VI) during the countercurrent contacting. The neptunium(V,VI) was partly or predominantly reduced to neptunium(IV) and could only partly leave the mixer-settler in that form: in stages 11 to 16, the Np from the solvent stream was displaced by uranium(VI) into the aqueous phase or stream, carried into stages 1 to 6 and re-extracted where the organic phase contained only a little uranium(VI). Thus, the neptunium(IV) accumulated in the extractor to a very considerable degree without a stationary state in regard to the neptunium being reached after a test duration of 20 hours (a stationary state in regard to the uranium was reached after only 5 hours, a stationary state being understood here to be a regime in which the concentrations of the neptunium and uranium in the individual stages of the mixer-settler do not undergo any further changes during the test and none of the extracted components accumulates, i.e., the quantity of neptunium and uranium entering the reactor per unit of time is equal to the quantity leaving it per unit of time). After the test duration mentioned, the concentration of neptunium still increased with the test period, the concentration of neptunium in the aqueous phase of only the 11th stage being 17 times higher than in the feed solution DF. In all, only about 50% by weight of the quantity of neptunium fed in with the feed solution DF left the mixer-settler. The rest of the neptunium was distributed between the outflows so that approximately 5% by weight were contained in the raffinate stream DW while 45% by weight contaminated the uranium in organic product stream DP.

(b) Corresponding Example with a flow scheme of the process according to the invention as shown in FIG. 2.

In this case, only a small part of solvent stream, organic extractant DX, was introduced into the first stage of the extractor, the remaining part DX1 being introduced into the 6th stage. Although the flow ratio of the organic phase to the aqueous phase (DX to DF+DS+DS1) is low in stages 1 to 6 (1:2.75), uranium completely extracted in stages 1 to 8, i.e. with a loss in the raffinate stream (DW) of <0.05% by weight. Their was no accumulation of neptunium as in the comparison test described in (a), although in this case the mixer-settler has more stages and the concentration of nitric acid in the feed solution DF is higher. Through the introduction of the organic phase in two parts (organic extractant streams DX and DX1), a stationary state in regard to the neptunium was reached after about 4 hours and remained stable throughout the entire 16-hour test period. In stages 1 to 8, the concentration of neptunium in the aqueous phase amounted to about 50% by weight of the concentration of neptunium in the feed solution. This value corresponds to a substantially complete transfer of the neptunium to the raffinate stream DW. In the aqueous phase in the other stages of the mixer-settler and in the organic phase in the mixer-settler as a whole, the concentration of neptunium was distinctly lower. The uranium in organic product stream DP was contaminated with only a small part of the neptunium fed in, i.e. <0.5% by weight (a more accurate value could not be obtained on account of the low radioactivity of the neptunium in the stream).

EXAMPLE 2

Figure 4:
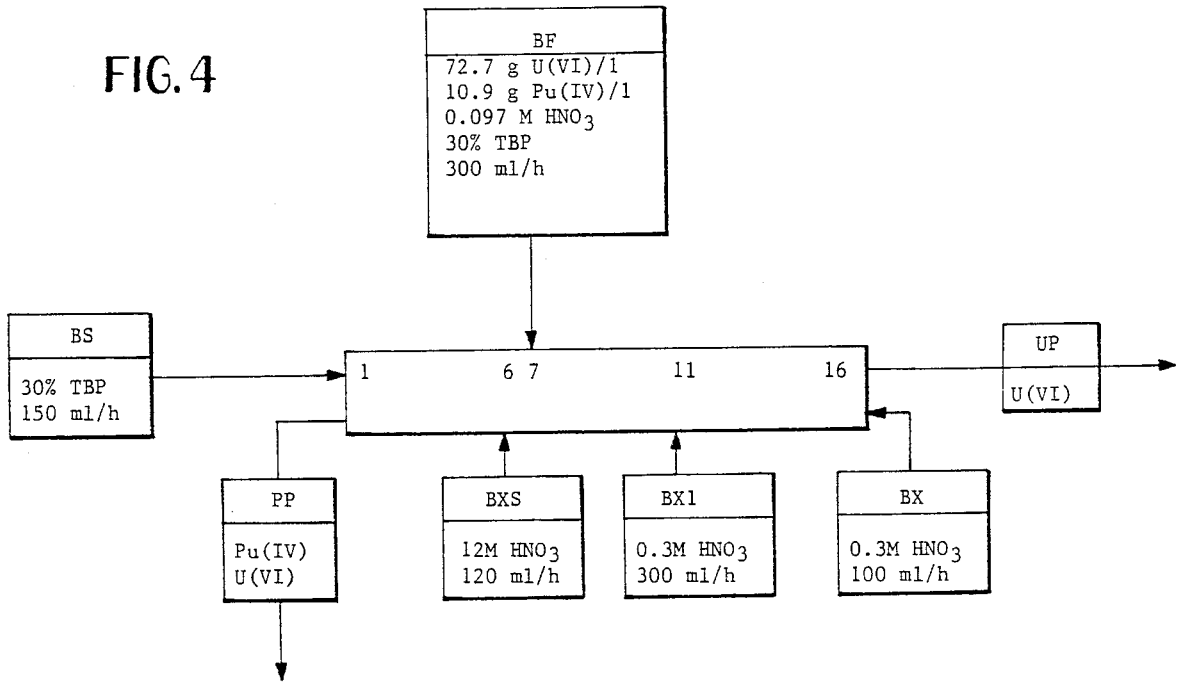

Selective re-extraction of plutonium from an organic phase charged with uranium(VI) and plutonium(IV): the flow scheme in its conventional form is shown in FIG. 3 while the flow scheme for the process according to the invention is shown in FIG. 4.

The plutonium(IV) was re-extracted with a dilute solution of nitric acid without reduction to plutonium(III). It was accepted, i.e., even intended, that plutonium product stream PP should also contain uranium. Uranium product stream UP was substantially plutonium-free. Such separation of plutonium from uranium is taken into consideration, for example, in the Civex process which is a special, simplified form of the Purex process. Organic feed solution BF had a composition typically encountered in the reprocessing of a fast breeder fuel. This feed solution is formed when uranium and plutonium are extracted from a fuel solution with TBP and the charged organic phase is washed first with a 3M and then with a 1.5M solution of nitric acid. In stages 7 to 16, the plutonium(IV) was re-extracted with dilute nitric acid. In the 6th stage, aqueous extractants BX+BX1, was acidified with aqueous extractant BXS and part of the co-re-extracted uranium was re-extracted into an organic washing solution, organic extractant BS.

Now, the modification to the conventional flow scheme made in the process according to the invention comprised introducing the re-extracting aqueous solution in two streams aqueous extractant streams BX and BX1, rather than in a single undivided stream BX. The separation of the plutonium from the uranium is promoted at a reduced temperature because the extractability of uranium(VI) increases with decreasing temperature while the extractability of plutonium(IV) decreases. In this Example, therefore, a temperature of 5° C. was applied. Since the distribution of uranium(VI) and plutonium(IV) between TBP solutions in kerosine or dodecane and aqueous nitric acid solutions is well known, concentrations of uranium and plutonium in plutonium product stream PP and uranium product stream UP were calculated using the VISO program (Nukleare Entsorgung, Vol. 2, p. 317 (1982) Verlag Chemie Weinheim). The following values were obtained:

|  | Conventional flow scheme | Flow scheme according to the invention |
| --- | --- | --- |
| Pu in the Pu-product (PP), g/l | 6.25 | 6.25 |
| U in the Pu-product (PP), g/l | 9.64 | 5.57 |
| % by weight Pu carried with the U-product (UP) | 0.000058 | 0.070 |

Although the uranium product was contaminated with plutonium to a somewhat greater extent in the flow scheme according to the invention than in the conventional flow scheme, it was still sufficiently pure. The concentration of uranium in the plutonium products was kept down to slightly less than half by the process according to the invention.

EXAMPLE 3

Selective re-extraction of plutonium from an organic phase charged with uranium(VI) and plutonium(IV).

Figure 5:
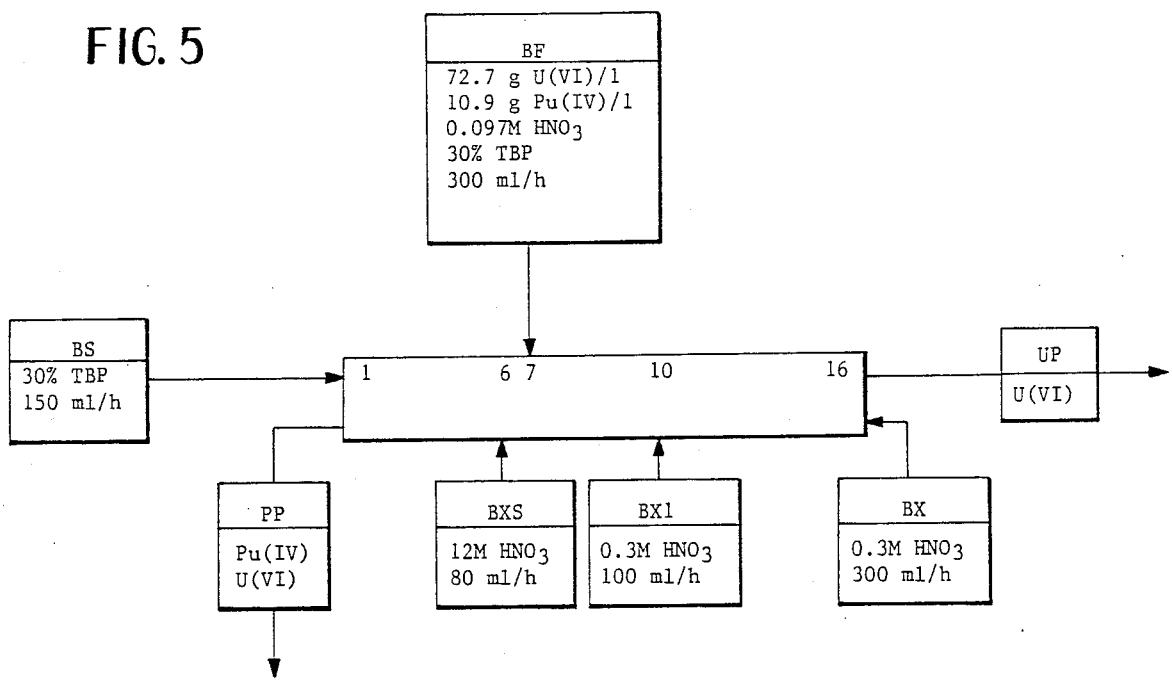
Figure 6:
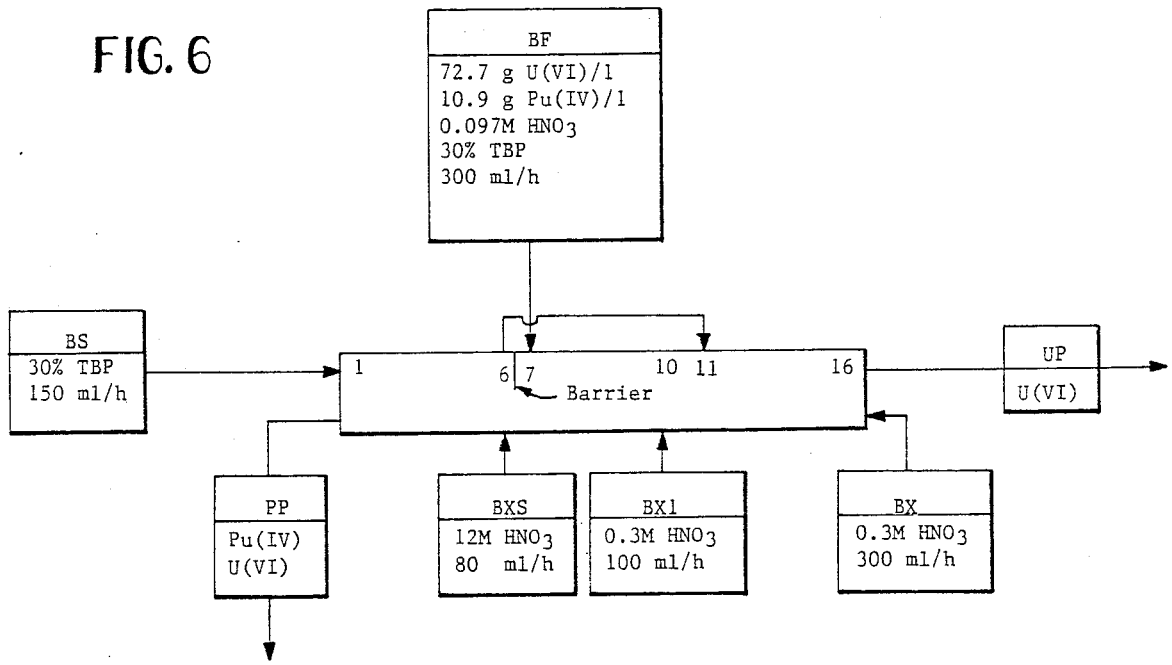

The same organic feed solution BF as in Example 2 was used, again at a temperature of 5° C. In this Example, the two versions of the process according to the invention were compared with one another, except that, in both versions, step (a) alone and steps (a)+(b), the quantities of aqueous re-extraction partial streams BX and BX1 (i.e., aqueous extractant stream BX and BX1) were reversed, i.e., the large partial stream in each case BX and not BX1. The flow rate of aqueous extractant stream BXS was reduced compared to the corresponding rate in Example 2. In the first test, cf. FIG. 5, feed solution BF was fed in at the 7th stage of the extractor. In the 2nd stage, cf. FIG. 6, BF was again fed in at the 7th stage, although the path of the organic phase emanating from organic extractant BS from the 6th to 7th stage was blocked and the organic phase was removed from the extractor at stage 6. It was then taken past stages 7 to 10 and fed back into the extractor at the 11th stage where it combined with the organic phase emanating from the feed solution stream BF. How this measure improved the separation of the plutonium from the uranium is again shown (as in Example 2) by the figures calculated with the VISCO program (the corresponding values for a conventional flow scheme, in which there is no diversion of an organic phase and in which the entire re-extracting solution is fed in at the 16th stage as organic extractant BS at a flow rate of 400 ml/h, are shown for comparison):

|  | Conventional flow scheme | Flow scheme according to FIG. 5 | Flow scheme according to FIG. 6 |
| --- | --- | --- | --- |
| Pu in the Pu-product (PP), g/l | 6.77 | 6.77 | 6.77 |
| U in the Pu-product (PP), g/l | 10.5 | 7.25 | 1.67 |
| % by weight Pu carried with the U-product (UP) | 0.0006 | 0.0024 | 0.06 |

The above figures show that the duration of the organic stream according to the flow scheme shown in FIG. 6 clearly suppresses the concentration of uranium in the plutonium product stream PP without unacceptably increasing the contamination of the uranium product stream UP with plutonium.

We claim:

1. In a liquid-liquid two-phase extraction process including the steps of introducing into an intermediate stage of a multistage extraction apparatus a feed solution comprised of water and one or more valuable material to be recovered by extraction, which feed solution contributes to an aqueous phase of the two-phase extraction process and which multistage extraction apparatus has a first end and a second end;

introducing into the first end of the multistage extraction apparatus an organic extractant comprised of an organic solvent, which organic extractant flows though the multistage extraction apparatus in a first direction and contributes to an organic phase of the two-phase extraction process;

contacting the feed solution and the organic extractant to transfer by extraction the one or more valuable material from the feed solution into the organic extractant to provide a charged organic phase;

introducing into the second end of the multistage extraction apparatus at least one aqueous extractant comprised of water for washing the charged organic phase to provide a washed organic phase comprised of one of said one or more valuable material, which at least one aqueous extractant flows through the multistate extraction apparatus in a second direction, which second direction is countercurrent to the first direction, and contributes to the aqueous phase, the improvement comprising:

dividing the organic extractant into at least two organic extractant streams prior to introducing the organic extractant into the multistage extraction apparatus; and introducing each of the at least two organic extractant streams into the multistage extraction apparatus at different stages, which different stages are both ahead of, with respect to the first direction, the intermediate stage at which the feed solution is introduced.

2. The process according to claim 1, comprising the further steps of:

removing at least a part of the aqueous phase from the multistage extraction apparatus at a stage thereof which is ahead of, with respect to the second direction, the intermediate stage at which the feed solution is introduced; and returning the at least a part of the aqueous phase which was removed to the multistage extraction apparatus at a stage thereof which is a predetermined number of stages after, with respect to the second direction, the intermediate stage at which the feed solution is introduced.

3. The process according to claim 1, wherein the at least two organic extractant streams are divided into a first organic extractant stream and a second organic extractant stream, the first and second organic extractant streams having different flow rates and having a ratio of flow rates ranging from 1:20 to 1:1.5, and the organic extractant stream having a higher flow rate being introduced into the multistage extraction apparatus nearer to the intermediate stage where the feed solution is introduced.

4. In a liquid-liquid two-phase extraction process including the steps of introducing into an intermediate stage of a multistage extraction apparatus a feed solution comprised of an organic solvent and one or more valuable material to be recovered by extraction, which feed solution contributes to an organic phase of the two-phase extraction process and which multistage extraction apparatus has a first end and a second end;

introducing into the first end of the multistage extraction apparatus an organic extractant comprised of an organic solvent, which organic extractant flows through the multistage extraction apparatus in a first direction and contributes to the organic phase;

introducing into the second end of the multistage extraction apparatus an aqueous extractant comprised of water, which aqueous extractant flows through the multistage extraction apparatus in a second direction, which second direction is countercurrent to the first direction, and contributes to an aqueous phase of the two-phase extraction process, contacting the feed solution and the aqueous extractant to transfer by extraction the one or more valuable material from the feed solution into the aqueous extractant to provide a charged aqueous phase, contacting the charged aqueous phase and the organic extractant to transfer by extraction one of said one or more valuable material from the charged aqueous phase to provide a washed organic phase, the improvement comprising:

dividing the aqueous extractant into at least two aqueous extractant streams prior to introducing the aqueous extractant into the multistage extraction apparatus; and introducing each of the at least two aqueous extractant streams into the multistage extraction apparatus at different stages, which different stages are both ahead, with respect to the second direction, of the intermediate stage at which the feed solution is introduced.

5. The process according to claim 4, comprising the further steps of:
removing at least a part of the organic phase from the multistage extraction apparatus at a stage thereof which is ahead of, with respect to the first direction, the intermediate stage at which the feed solution is introduced; and
returning the at least a part of the organic phase which was removed to the multistage extraction apparatus at a stage thereof which is a predetermined number of stages after, with respect to the first direction, the intermediate stage at which the feed solution is introduced.

6. The process according to claim 5, wherein a barrier for the organic phase is positioned in the multistage extraction apparatus at the stage thereof which is ahead of the intermediate stage, at which stage the at least a part of the organic phase is removed, and wherein the predetermined number of stages ranges from 2-12.

7. The process according to claim 5, wherein the aqueous extractant is divided into a first aqueous extractant stream and a second aqueous extractant stream, the first and second aqueous extractant streams having different flow rates and having a ratio of flow rates ranging from 1:10 to 10:1, and the aqueous extractant stream having a higher flow rate being introduced into the multistage extraction apparatus nearer to the intermediate stage where the feed solution is introduced.

8. The process according to claim 4, wherein the at least two aqueous extractant streams are comprised of a first aqueous extractant stream and a second aqueous extractant stream utilized in different quantities and introduced into the multistage extraction apparatus at different stages, which different stages are both ahead of, with respect to the second direction, the intermediate stage at which the feed solution is introduced, and wherein the stage at which the second aqueous extractant stream is introduced is nearer to the intermediate stage than the stage at which the first aqueous extractant stream is introduced and a smaller quantity of the second aqueous extractant stream is introduced than the quantity of the first aqueous extractant stream.

9. The process according to claim 4 wherein aqueous extractant is comprised of a first aqueous extractant stream and a second aqueous extractant stream, the first and second aqueous extractant streams having different flow rates and having a ratio of flow rates ranging from 1:20 to 1:1.5, and the aqueous extractant stream having a higher flow rate being introduced into the multistage extraction apparatus nearer to the intermediate stage where the feed solution is introduced.

10. In a liquid-liquid two-phase extraction process including the steps of
introducing into an intermediate stage of a multistage extraction apparatus a feed solution comprised of water and one or more actinide element including at least uranium to be recovered by extraction, which feed solution contributes to an aqueous phase of the two-phase extraction process and which multistage extraction apparatus has a first end and a second end;
introducing into the first end of the multistage extraction apparatus an organic extractant comprised of an organic solvent and tributylphosphate, which organic extractant flows though the multistage extraction apparatus in a first direction and contributes to an organic phase of the two-phase extraction process;
contacting the feed solution and the organic extractant to transfer by extraction the one or more actinide element from the feed solution into the organic extractant to provide a charged organic phase;
introducing into the second end of the multistage extraction apparatus at least one aqueous extractant comprised of water and nitric acid for washing the charged organic phase to provide a washed organic phase comprised of uranium but substantially free of other actinide elements, which at least one aqueous extractant flows through the multistate extraction apparatus in a second direction, which second direction is countercurrent to the first direction, and contributes to the aqueous phase, the improvement comprising:
dividing the organic extractant into at least two organic extractant streams prior to introducing the organic extractant into the multistage extraction apparatus; and
introducing each of the at least two organic extractant streams into the multistage extraction apparatus at different stages, which different stages are both ahead of, with respect to the first direction, the intermediate stage at which the feed solution is introduced.

11. The process according to claim 10, comprising the further steps of:
removing at least a part of the aqueous phase from the multistage extraction apparatus at a stage thereof which is ahead of, with respect to the second direction, the intermediate stage at which the feed solution is introduced; and
returning the at least a part of the aqueous phase which was removed to the multistage extraction apparatus at a stage thereof which is a predetermined number of stages after, with respect to the second direction, the intermediate stage at which the feed solution is introduced.

12. The process according to claim 10, wherein the at least two organic extractant streams are divided into a first organic extractant stream and a second organic extractant stream, the first and second organic extractant streams having different flow rates and having a ratio of flow rates ranging from 1:20 to 1:1.5, and the organic extractant stream having a higher flow rate being introduced into the multistage extraction apparatus nearer to the intermediate stage where the feed solution is introduced.

13. The process according to claim 10, wherein the one or more actinide element includes three elements, which three actinide elements are uranium, plutonium and neptunium.

14. In a liquid-liquid two-phase extraction process including the steps of
introducing into an intermediate stage of a multistage extraction apparatus a feed solution comprised of an organic solvent and one or more actinide element including at least uranium and plutonium to be recovered by extraction, which feed solution contributes to an organic phase of the two-phase extraction process and which multistage extraction apparatus has a first end and a second end;

introducing into the first end of the multistage extraction apparatus an organic extractant comprised of an organic solvent and tributylphosphate, which organic extractant flows through the multistage extraction apparatus in a first direction and contributes to the organic phase;

introducing into the second end of the multistage extraction apparatus an aqueous extractant comprised of water and nitric acid, which aqueous extractant flows through the multistage extraction apparatus in a second direction, which second direction is countercurrent to the first direction, and contributes to an aqueous phase of the two-phase extraction process, contacting the feed solution and the aqueous extractant to transfer by extraction the one or more actinide element from the feed solution into the aqueous extractant to provide a charged aqueous phase, contacting the charged aqueous phase and the organic extractant to transfer by extraction uranium from the charged aqueous phase to provide a washed organic phase comprised of uranium but substantially free of other actinide elements, the improvement comprising:

dividing the aqueous extractant into at least two aqueous extractant streams prior to introducing the aqueous extractant into the multistage extraction apparatus; and introducing each of the at least two aqueous extractant streams into the multistage extraction apparatus at different stages, which different stages are both ahead, with respect to the second direction, of the intermediate stage at which the feed solution is introduced.

15. The process according to claim 14, comprising the further steps of:

removing at least a part of the organic phase from the multistage extraction apparatus at a stage thereof which is ahead of, with respect to the first direction, the intermediate stage at which the feed solution is introduced; and returning the at least a part of the organic phase which was removed to the multistage extraction apparatus at a stage thereof which is a predetermined number of stages after, with respect to the first direction, the intermediate stage at which the feed solution is introduced.

16. The process according to claim 15, wherein a barrier for the organic phase is positioned in the multistage extraction apparatus at the stage thereof which is ahead of the intermediate stage, at which stage the at least a part of the organic phase is removed, and wherein the predetermined number of stages ranges from 2-12.

17. The process according to claim 15, wherein the aqueous extractant is divided into a first aqueous extractant stream and a second aqueous extractant stream, the first and second aqueous extractant streams having different flow rates and having a ratio of flow rates ranging from 1:10 to 10:1, and the aqueous extractant stream having a higher flow rate being introduced into the multistage extraction apparatus nearer to the intermediate stage where the feed solution is introduced.

18. The process according to claim 14 wherein the at least two aqueous extractant streams are comprised of a first aqueous extractant stream and a second aqueous extractant stream utilized in different quantities and introduced into the multistage extraction apparatus at different stages, which different stage are both ahead of, with respect to the second direction, the intermediate stage at which the feed solution is introduced, and wherein the stage at which the second aqueous extractant stream is introduced is nearer to the intermediate stage than the stage at which the first aqueous extractant stream is introduced and a smaller quantity of the second aqueous extractant stream is introduced than the quantity of the first aqueous extractant stream.

19. The process according to claim 14, wherein the aqueous extractant is comprised of a first aqueous extractant stream and a second aqueous extractant stream, the first and second aqueous extractant streams having different flow rates and having a ratio of flow rates ranging from 1:20 to 1:1.5, and the aqueous extractant stream having a higher flow rate being introduced into the multistage extraction apparatus nearer to the intermediate stage where the feed solution is introduced.

20. The process according to claim 14, wherein the one or more actinide element includes three elements, which three actinide elements are uranium, plutonium and neptunium.

* * * * *